(12) United States Patent
Velke et al.

(10) Patent No.: US 6,658,831 B2
(45) Date of Patent: Dec. 9, 2003

(54) POWER LAWN MOWER WITH DECK LIFT SYSTEM

(75) Inventors: James D. Velke, Germantown, MD (US); William R. Wright, Clarksburg, MD (US)

(73) Assignee: Wright Manufacturing, Inc., Frederick, MD (US)

(*) Notice: Subject to any disclaimer, the term of this patent is extended or adjusted under 35 U.S.C. 154(b) by 0 days.

(21) Appl. No.: 09/973,957

(22) Filed: Oct. 11, 2001

(65) Prior Publication Data

US 2002/0059788 A1 May 23, 2002

Related U.S. Application Data

(63) Continuation-in-part of application No. 09/714,814, filed on Nov. 17, 2000, now Pat. No. 6,438,930.

(51) Int. Cl.$^7$ ............................................... A01D 34/66
(52) U.S. Cl. ......................................... 56/14.7; 56/15.2
(58) Field of Search ................................ 56/15.7, 17.1, 56/15.8, 15.1, 15.2, 14.7, DIG. 22

(56) References Cited

U.S. PATENT DOCUMENTS

| | | | | |
|---|---|---|---|---|
| 2,689,440 A | * | 9/1954 | Schrooppel | 56/15.7 |
| 3,315,759 A | * | 4/1967 | Bohlen | 180/6.24 |
| 3,654,749 A | * | 4/1972 | Ostergren et al. | 56/15.8 |
| 3,706,188 A | * | 12/1972 | Musgrave | 56/15.8 |
| 3,870,119 A | | 3/1975 | Wurst | |
| 3,874,150 A | * | 4/1975 | Boeck | 56/17.1 |
| 4,120,136 A | * | 10/1978 | Rose | 56/17.1 |
| 4,577,455 A | * | 3/1986 | Amano et al. | 56/17.1 |
| 4,760,687 A | * | 8/1988 | Siegrist | 56/15.8 |
| 4,878,339 A | | 11/1989 | Marier et al. | |
| 4,998,948 A | | 3/1991 | Osterling | |
| 5,079,926 A | * | 1/1992 | Nicol | 56/12.7 |
| 5,307,612 A | | 5/1994 | Tomiyama et al. | |
| 5,410,865 A | * | 5/1995 | Kurohara et al. | 56/15.9 |
| 5,463,853 A | | 11/1995 | Santoli et al. | |
| 5,507,138 A | | 4/1996 | Wright et al. | |
| 5,517,809 A | | 5/1996 | Rich | |
| 5,564,721 A | | 10/1996 | Wians | |
| 5,600,944 A | | 2/1997 | Wright et al. | |
| 5,653,466 A | | 8/1997 | Berrios | |
| 5,765,347 A | | 6/1998 | Wright et al. | |
| 5,785,453 A | | 7/1998 | Marty et al. | |
| 5,809,755 A | | 9/1998 | Velke et al. | |
| 5,809,756 A | | 9/1998 | Scag et al. | |
| 5,813,203 A | * | 9/1998 | Peter | 56/17.2 |
| 5,842,707 A | | 12/1998 | Smith | |
| 5,865,020 A | | 2/1999 | Busboom et al. | |
| 5,913,802 A | | 6/1999 | Mullet et al. | |
| 5,964,082 A | | 10/1999 | Wright et al. | |
| 5,984,031 A | | 11/1999 | Velke et al. | |
| 6,023,921 A | * | 2/2000 | Burns et al. | 56/16.3 |
| 6,059,055 A | | 5/2000 | Velke et al. | |
| 6,347,502 B1 | * | 2/2002 | deVries | 56/15.7 |

* cited by examiner

*Primary Examiner*—Árpád Fábián Kovács
(74) *Attorney, Agent, or Firm*—Nixon & Vanderhye P.C.

(57) ABSTRACT

A self-propelled power lawn mower is provided with a deck lifting system. The operator can lift the cutter deck or the engine deck by pulling upward/backward on a deck-lifting lever. Moreover, a latch system for enabling the deck to be lowered and/or adjusted.

8 Claims, 17 Drawing Sheets

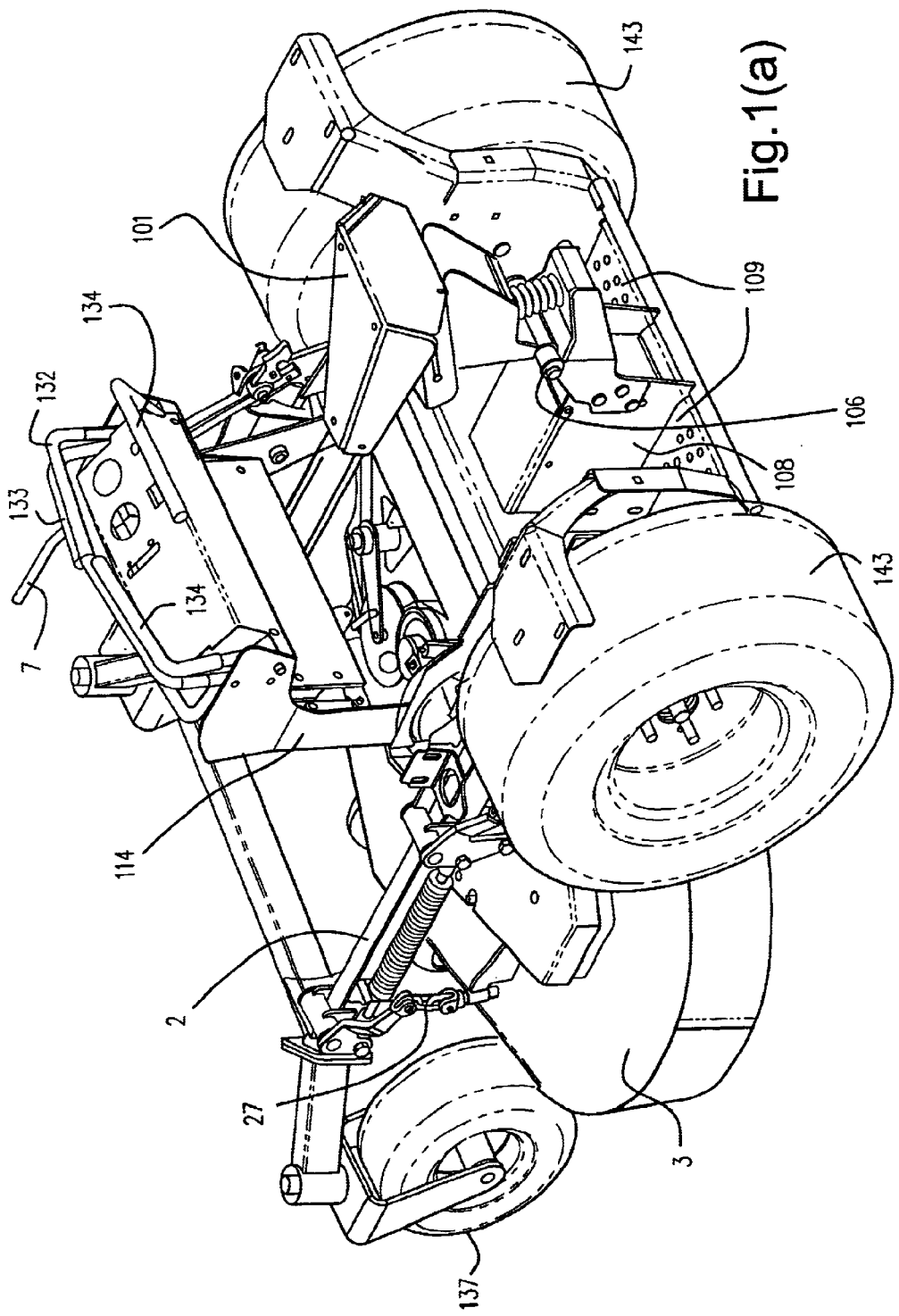

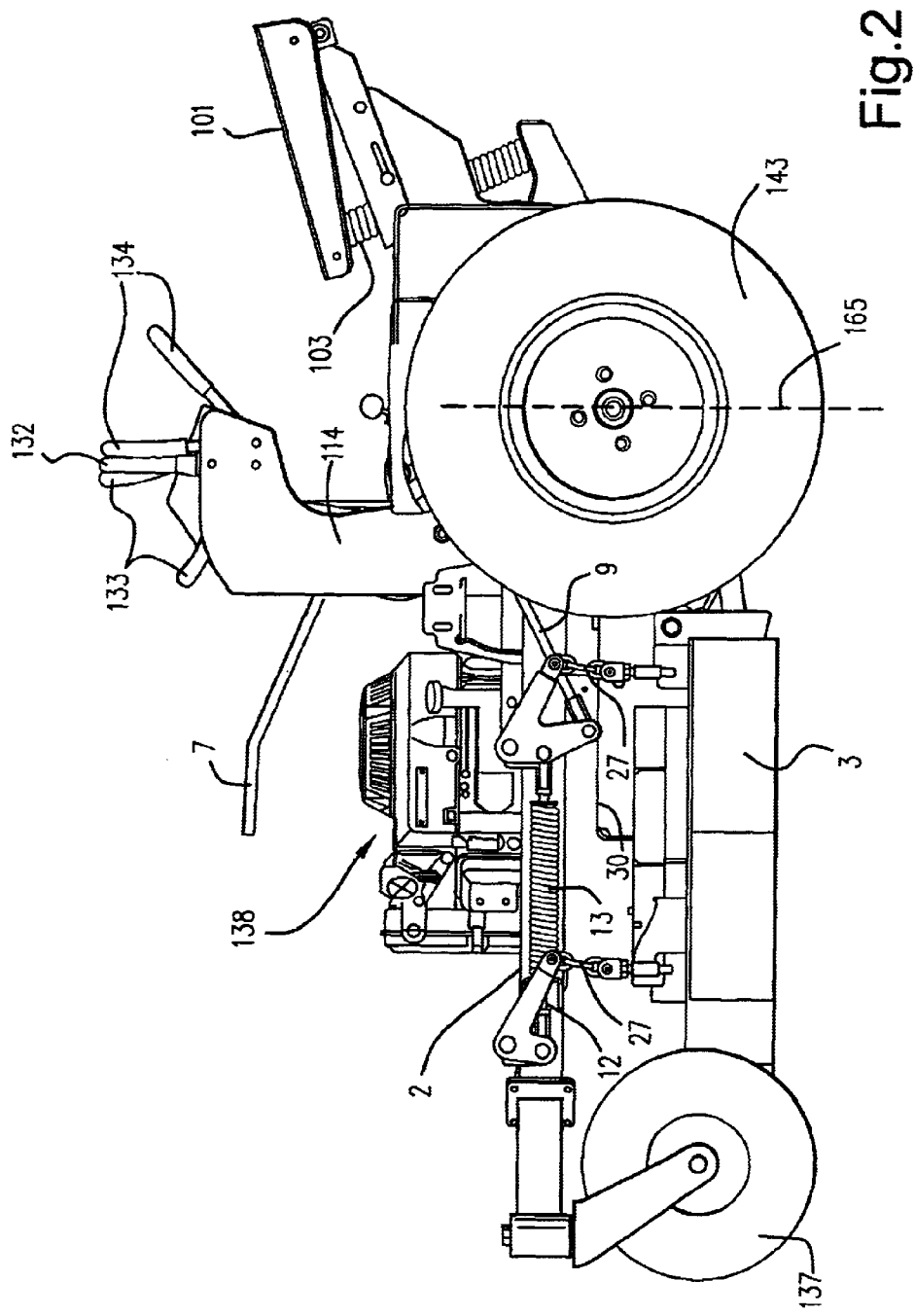

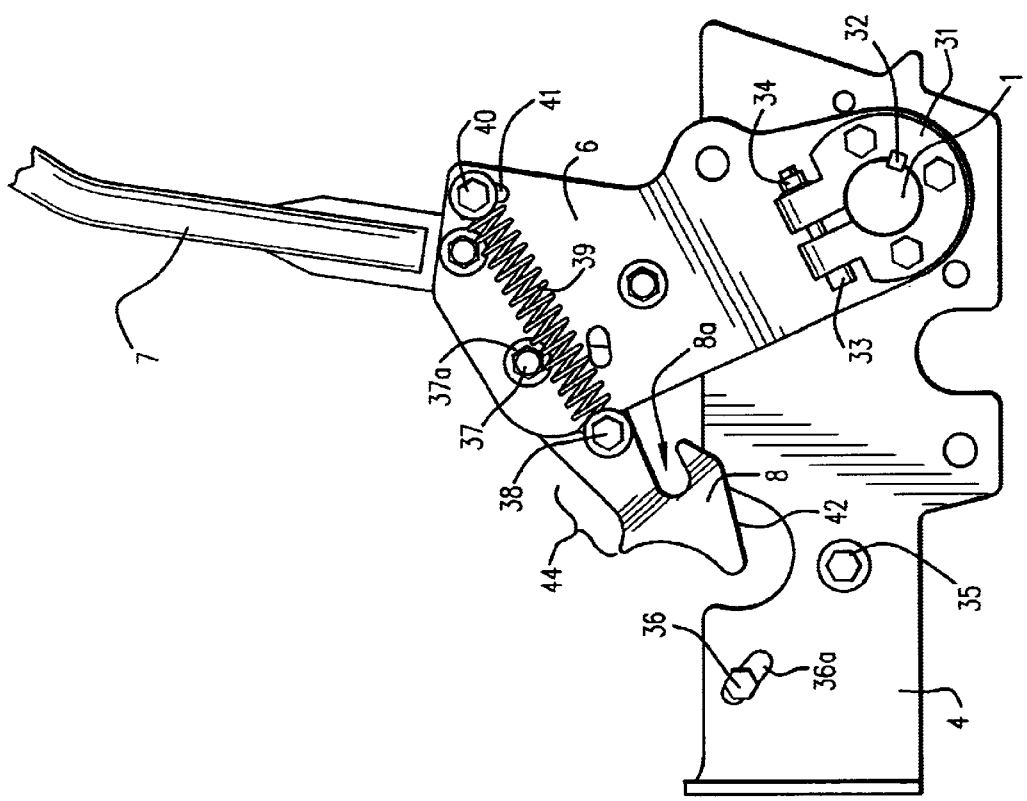
Fig.8(a) Stage 1

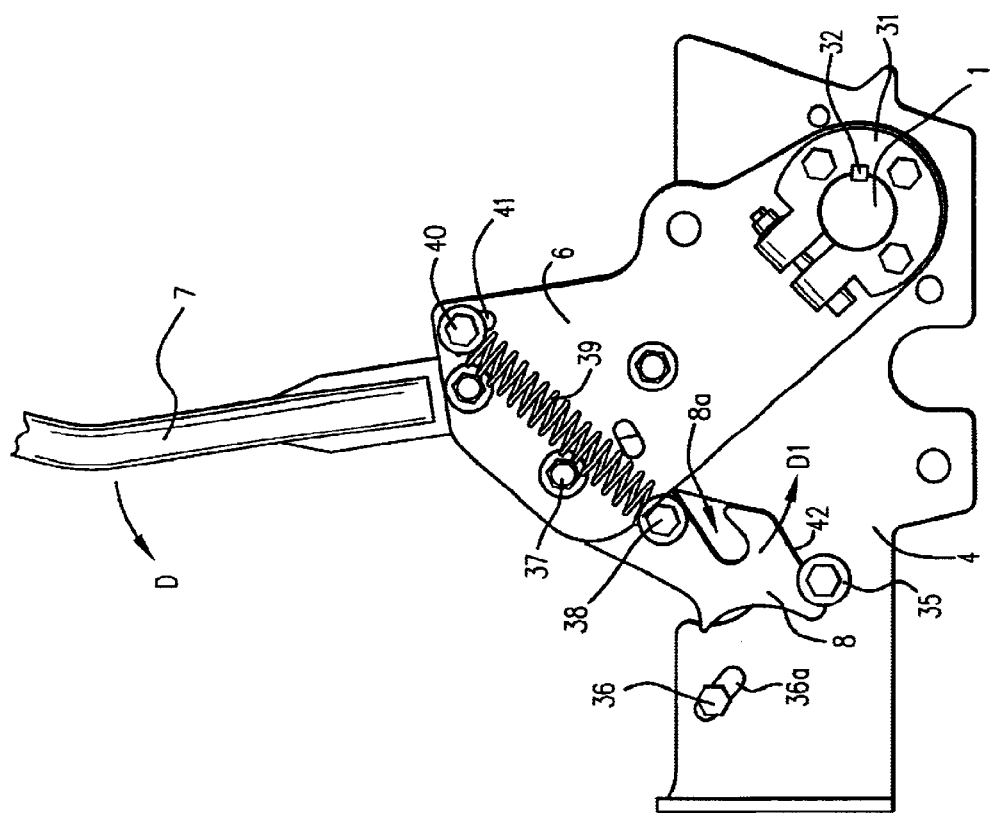
Fig.8(b) Stage 2

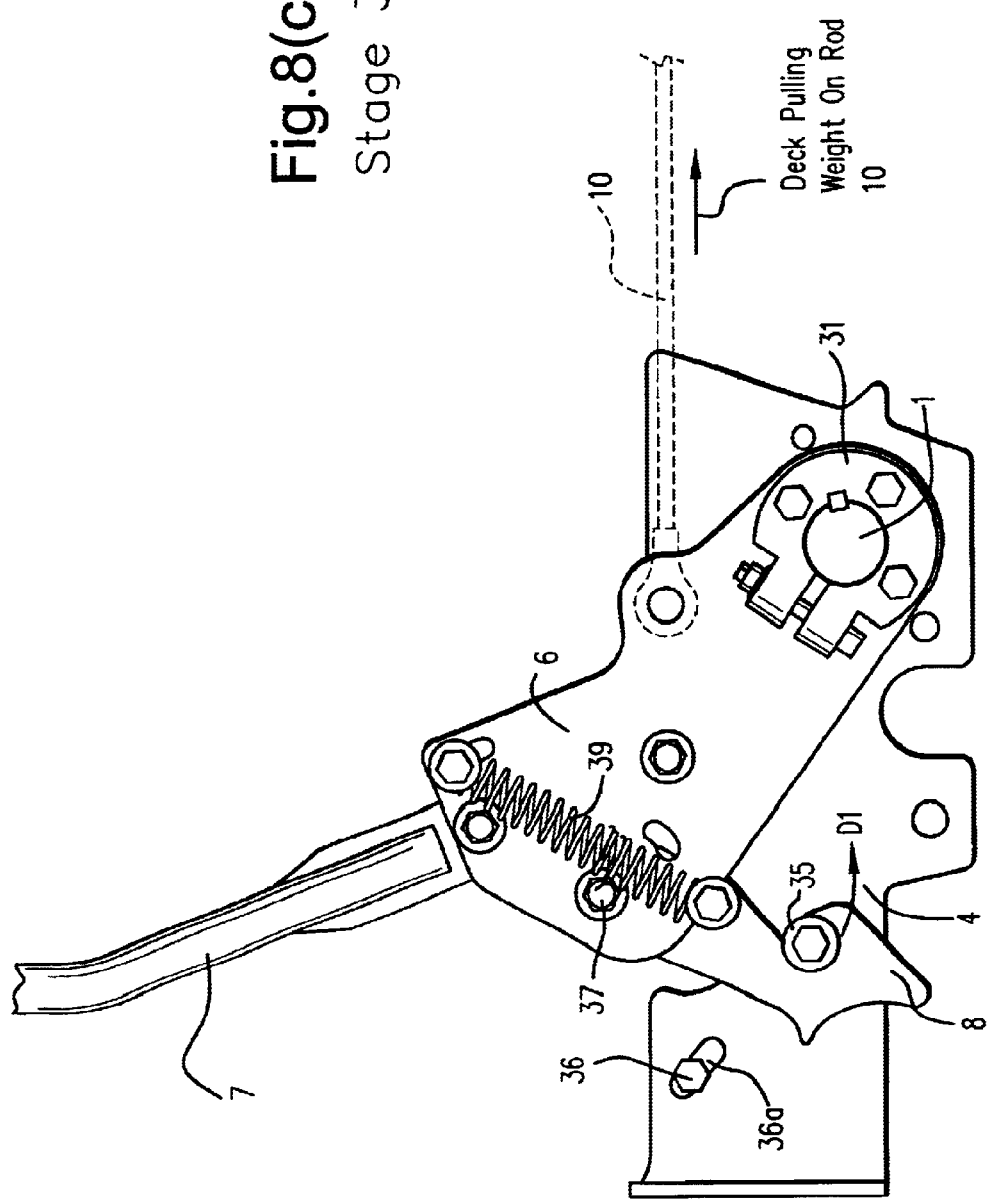

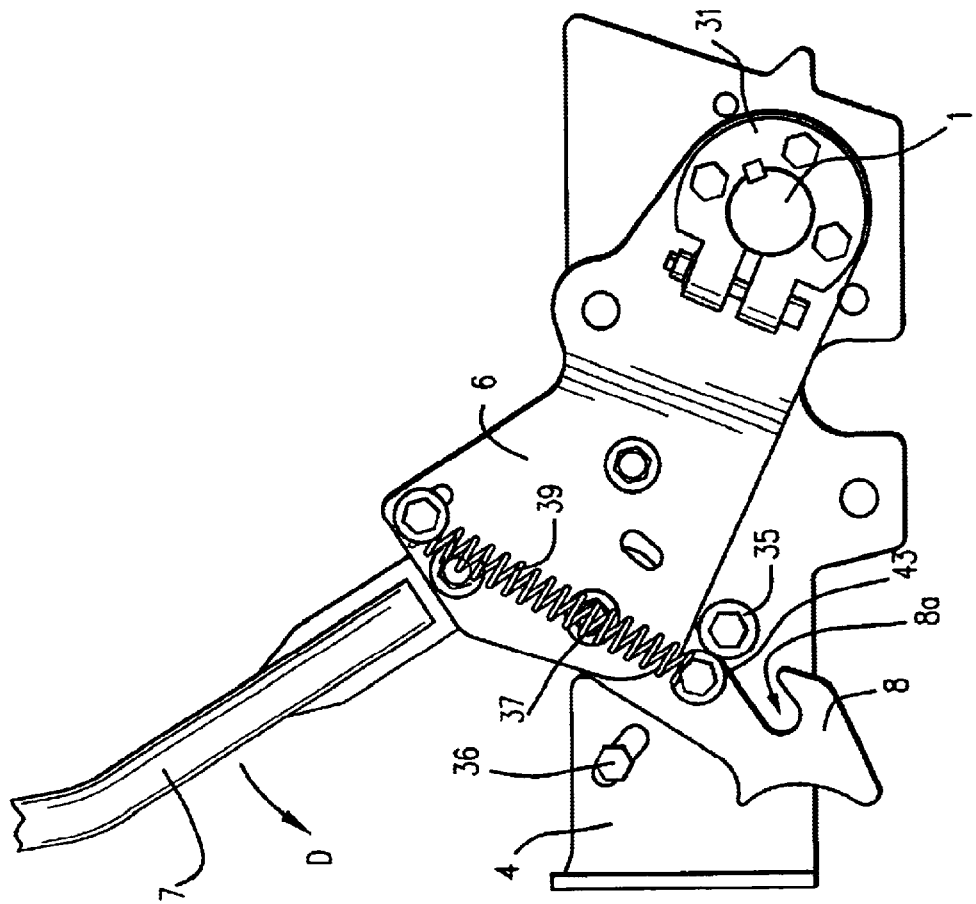
Fig.8(d) Stage 4

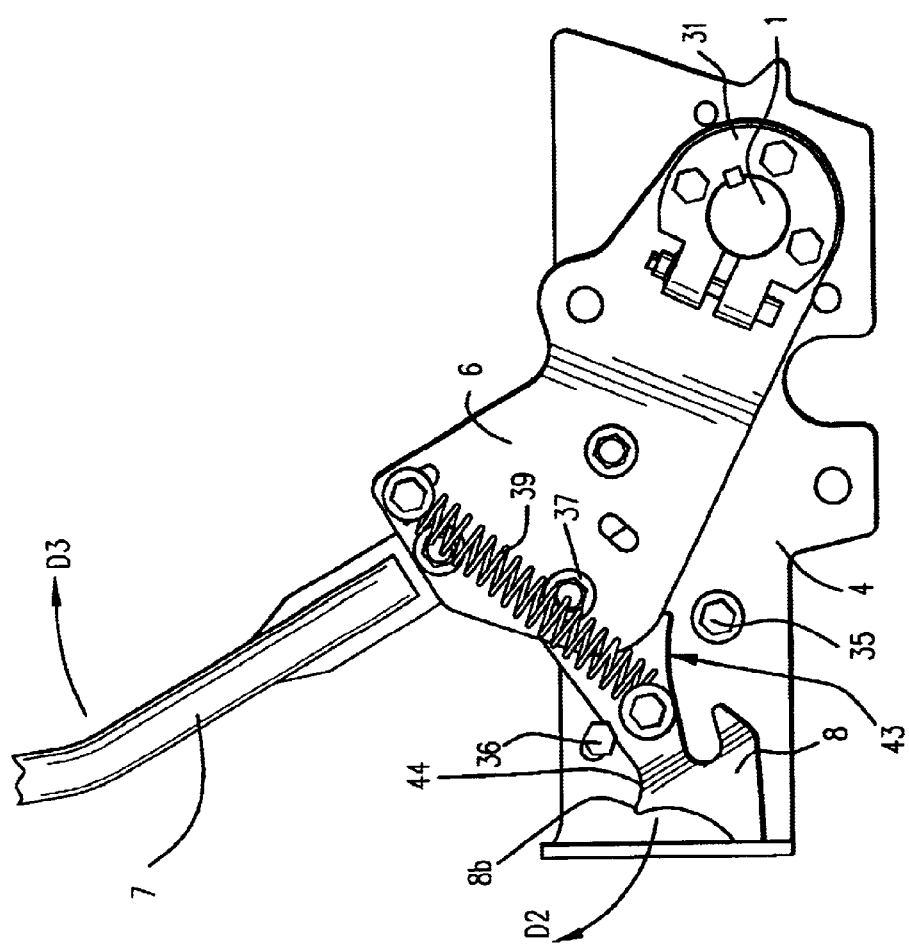

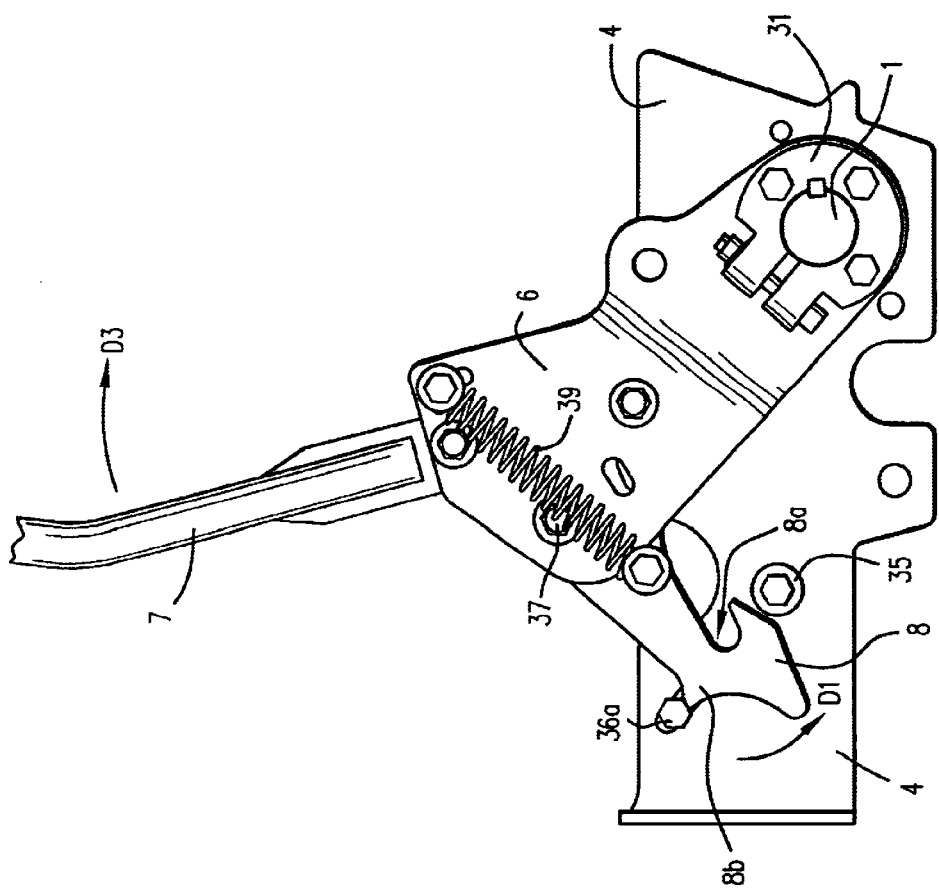
Fig.8(f) Stage 6

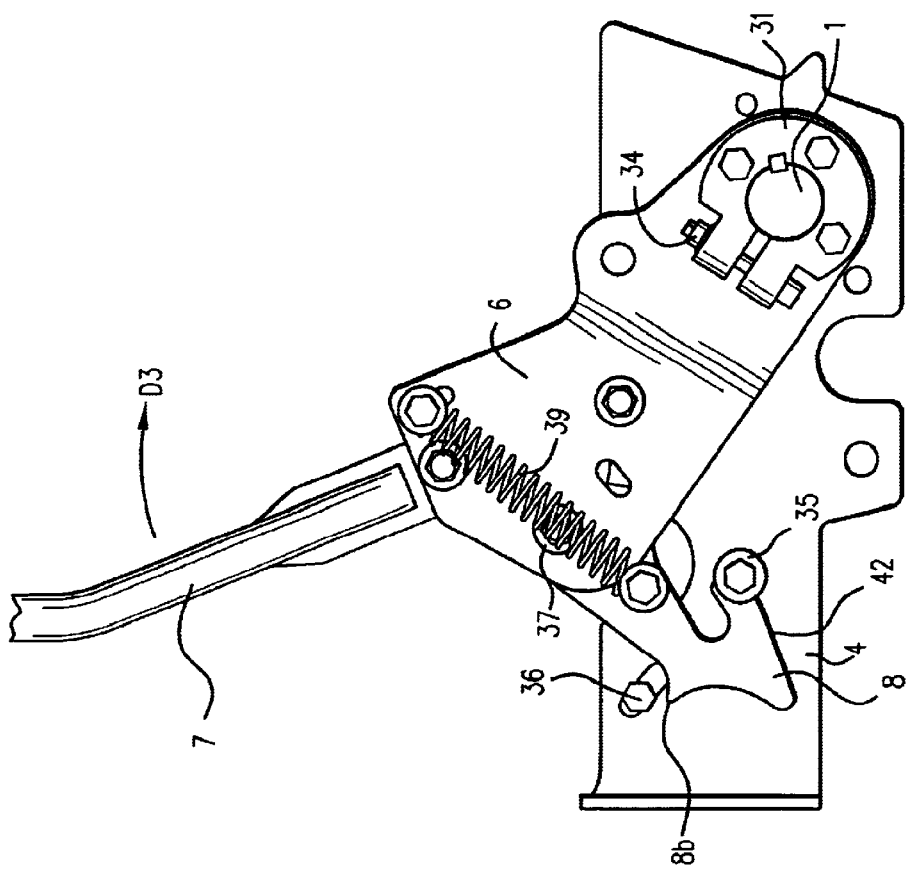
Fig.8(g) Stage 7

POWER LAWN MOWER WITH DECK LIFT SYSTEM

This application is a continuation-in-part (CIP) of U.S. Ser. No. 09/714,814, filed Nov. 17, 2000 (now U.S. Pat. No. 6,438,930), the disclosure of which is hereby incorporated herein by reference.

Known commercial power mowers are generally divided into three separate categories: self-propelled walk-behind mowers, ride-on mowers operated by a seated occupant, and stand-on mowers operated by a standing occupant. Unfortunately, conventional ride-on and stand-on mowers often suffer from inefficient deck lift systems.

SUMMARY OF THE INVENTION

An object of this invention is to provide a power mower including an efficient deck lift system.

Another object of this invention is to provide a deck lift system which lifts an engine deck and a cutter deck together with one another, so that control arms utilized for positioning the deck can be designed to be shorter thereby enabling the deck assembly to be more resistant to negative impacts which may be caused by sideloads.

Another object of this invention is to provide a power mower where the operator is capable of standing or sitting during different modes of mower operation.

Yet another object of this invention is to satisfy or fulfill one or more of the above listed objects.

In certain example embodiments of this invention, one or more of the above-listed needs is/are satisfied by providing a power mower comprising:

a cutting deck;
at least one drive wheel;
an engine for driving at least one cutting blade;
a deck lift system for selectively raising and lowering the cutting deck, said deck lift system including:
  a deck lift lever which when pulled causes a laterally oriented bar and a support to rotate about a common axis defined by an axis of said bar in order to lift said cutting deck;
  a pivotal latch pivotally coupled to said support at a latch pivot axis;
  a spring for biasing said pivotal latch relative to said support;
  wherein said spring biases said pivotal latch in a first direction when a longitudinal axis of said spring is on a first side of said latch pivot axis, and said spring biases said pivotal latch in a second direction when the longitudinal axis of said spring is on a second different side of said latch pivot axis; and
  wherein said longitudinal axis of said spring is switched from the first side of said latch pivot axis to the second different side of said latch pivot axis during raising of said cutting deck as said deck lift lever is pulled.

In certain embodiments of this invention, the deck lift system further includes a first projection and a second projection protruding from a surface of said support, and wherein when said spring is on the first side of said latch pivot axis said spring biases said pivotal latch in the first direction toward the first projection, and when said spring is on the second different side of said latch pivot axis said spring biases said pivotal latch in the second direction away from the first projection and toward the second projection.

In certain embodiments of this invention, pulling of the lever causes first, second, third, and fourth deck lift pull rods to moves toward a rear of the mower which in turn causes respective first, second, third and fourth deck lift arms to rotate and cause said cutting deck to be raised at four different locations.

Certain other example embodiments of this invention fulfill one or more of the above-listed objects and/or needs by providing a power mower including a deck lift system, the deck lift system of the power mower comprising:

a deck lift lever for selectively raising and lowering the cutting deck; and
wherein pulling of the lever causes an elongated horizontally aligned bar to rotate which in turn causes first, second, third, and fourth elongated deck lift pull rods to move toward a rear of the mower which in turn causes respective first, second, third and fourth deck lift arms to rotate and cause the cutting deck to be raised at at least four different locations.

IN THE DRAWINGS

FIGS. 1(a) and 1(b) are perspective views of a zero radius turning self-propelled power mower according to an embodiment of this invention, the mower including both standing and sitting modes; these figures illustrating the seat in a deployed position.

FIG. 2 is a side plan/elevational view of the mower of FIGS. 1(a) and 1(b).

FIGS. 8(a) through 8(g) are progressive side plan views of a hook and latch system as the deck is progressively lifted and then lowered throughout a cycle including seven progressive stages.

Figure 9B:
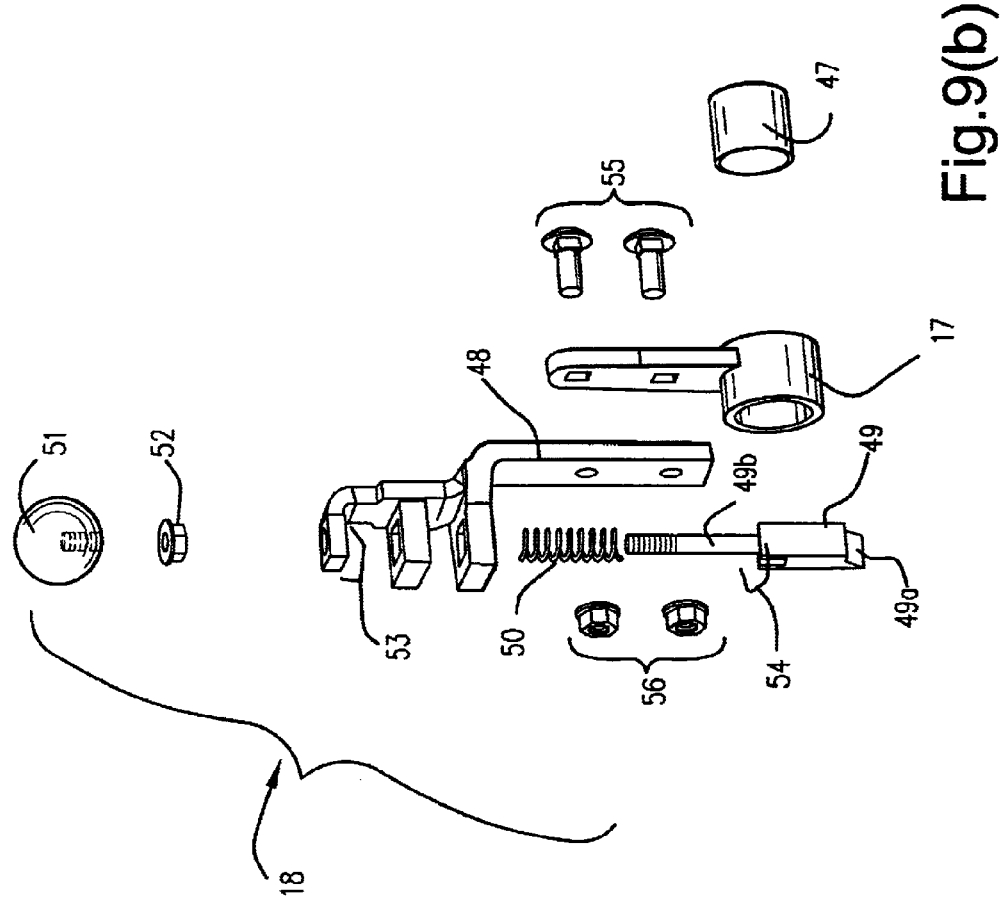
Figure 9A:
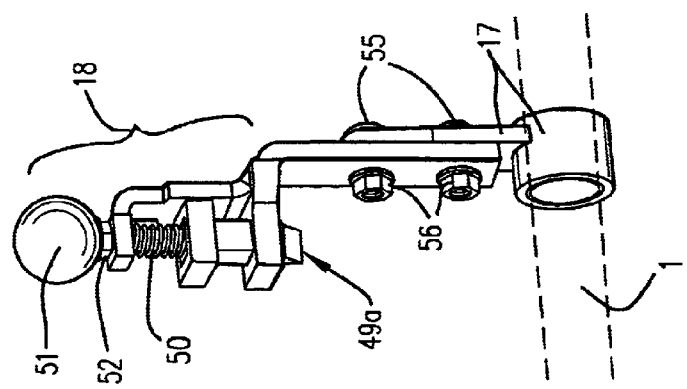

FIG. 9(a) is a perspective view of a portion of the deck height selector of the mower of FIGS. 1–8.

FIG. 9(b) is an exploded view of the structure of FIG. 9(a).

Figure 10:
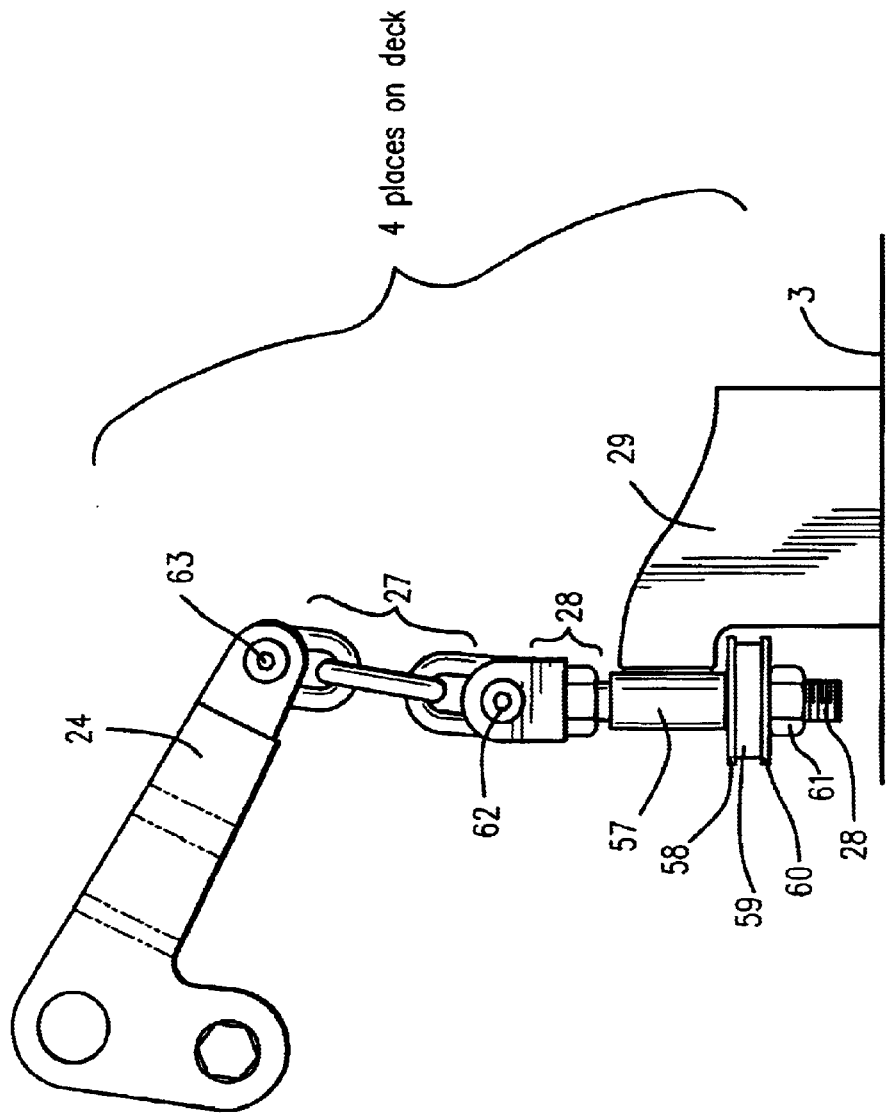

FIG. 10 is a side plan view of the left-front deck lift arm, and corresponding linkage, of the mower of FIGS. 1–9.

DETAILED DESCRIPTION OF CERTAIN EMBODIMENTS OF THIS INVENTION

Referring now more particularly to the accompanying drawings in which like reference numerals indicate like parts throughout the several views.

Figure 1B:
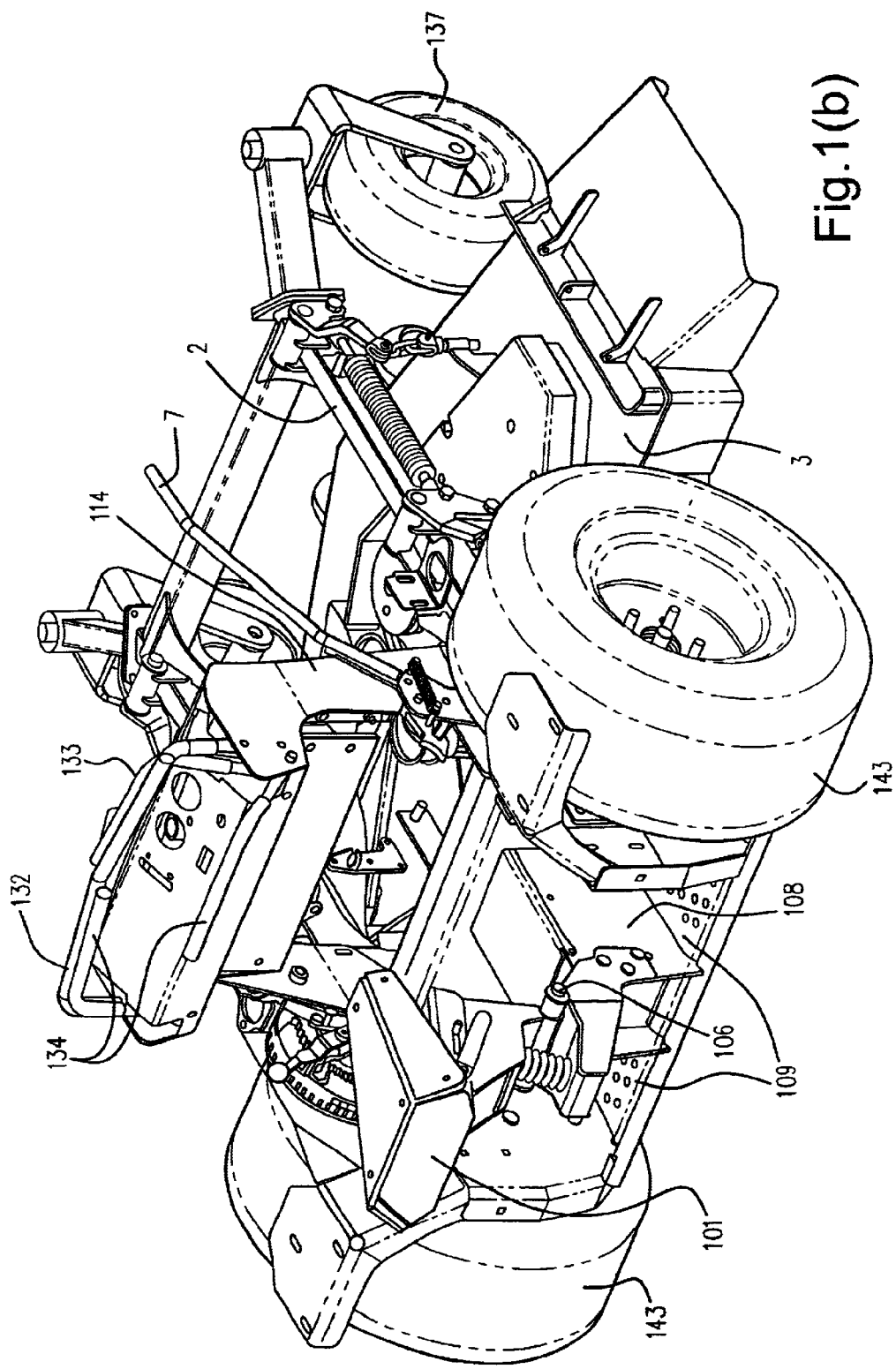
Figure 3:
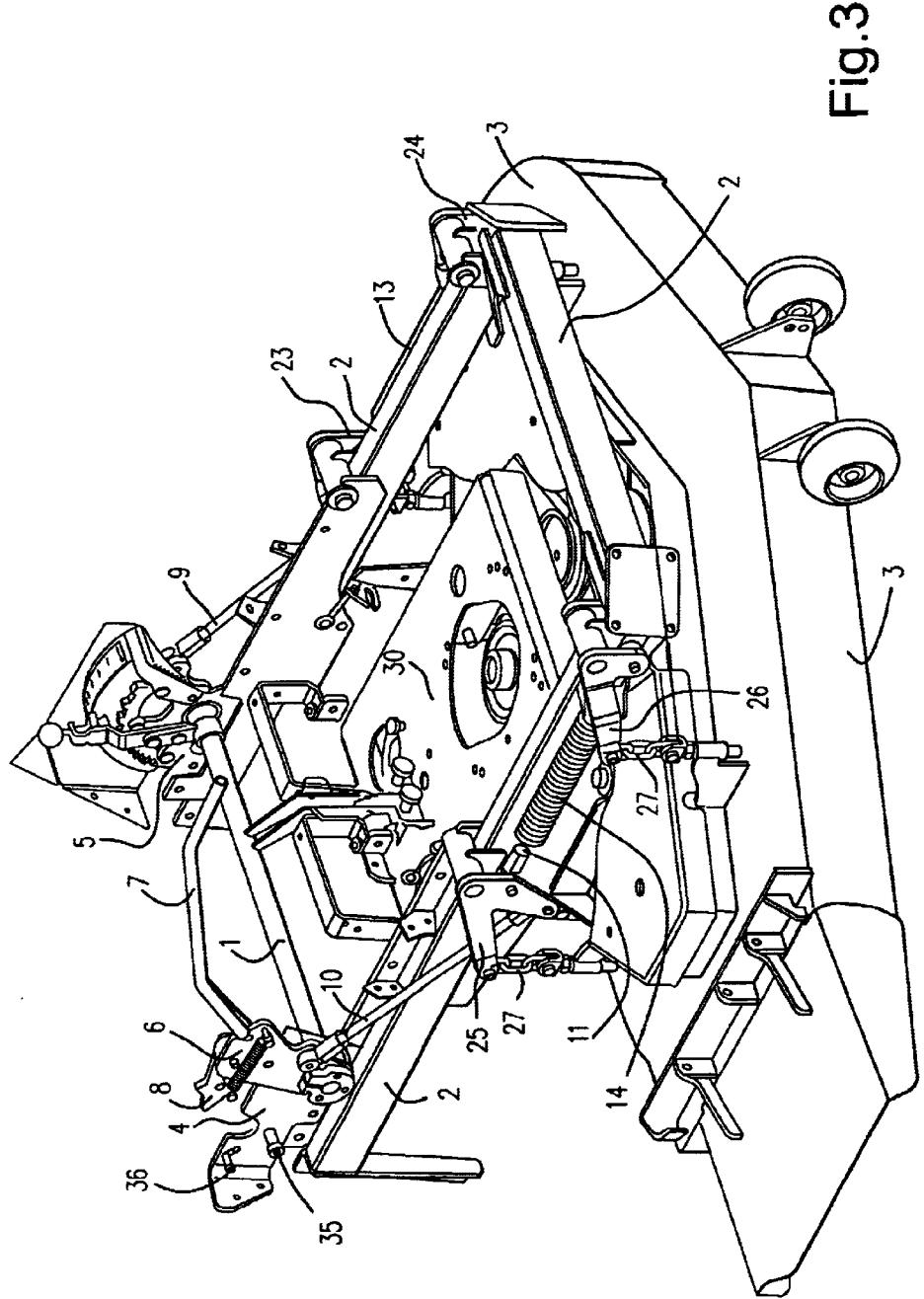
FIG. 3 is a perspective view primarily of the deck lift system of the mower of FIGS. 1–2.
Figure 4:
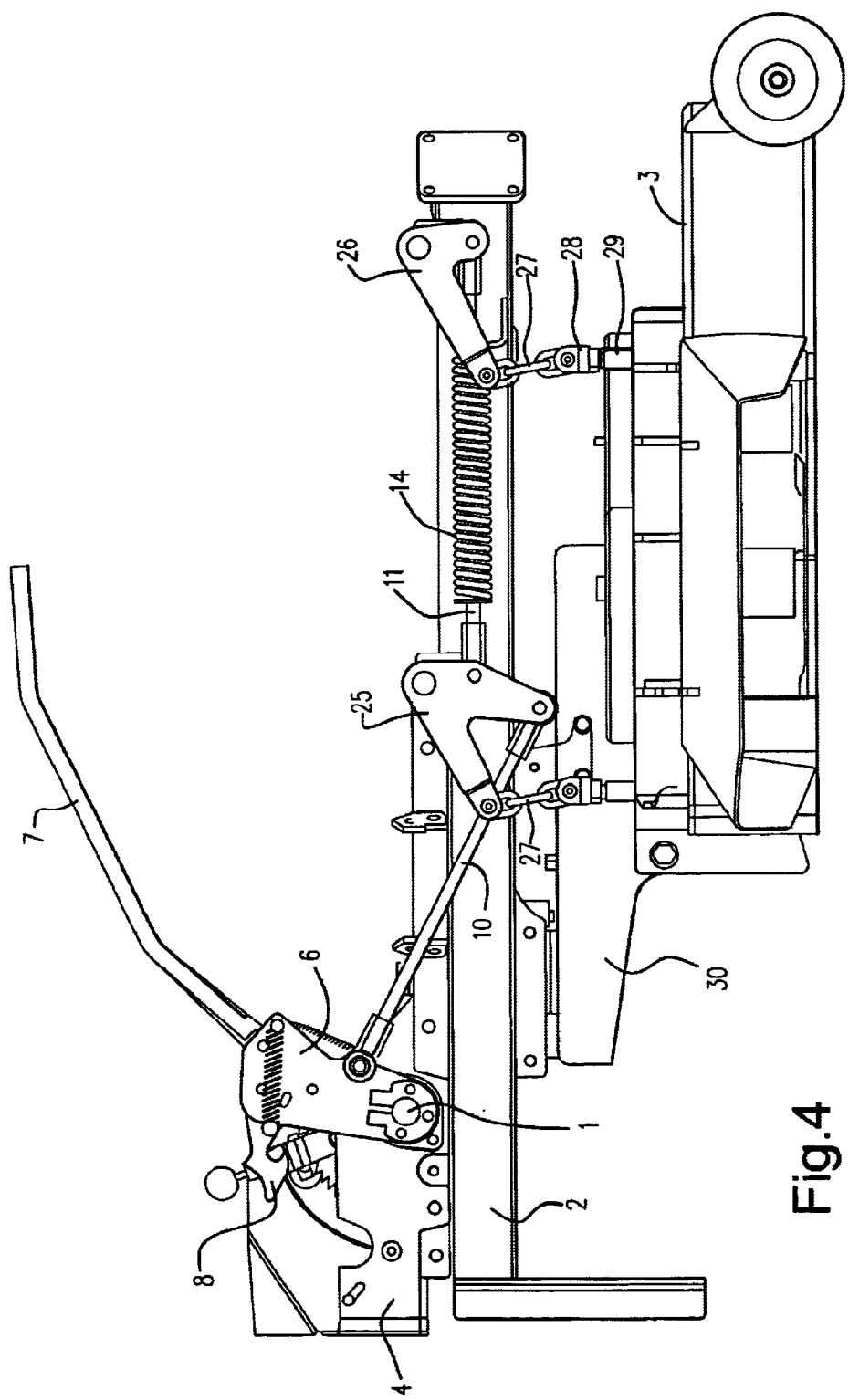
FIG. 4 is a side plan/elevational view of the deck lift system of the mower of FIGS. 1–3.
Figure 5:
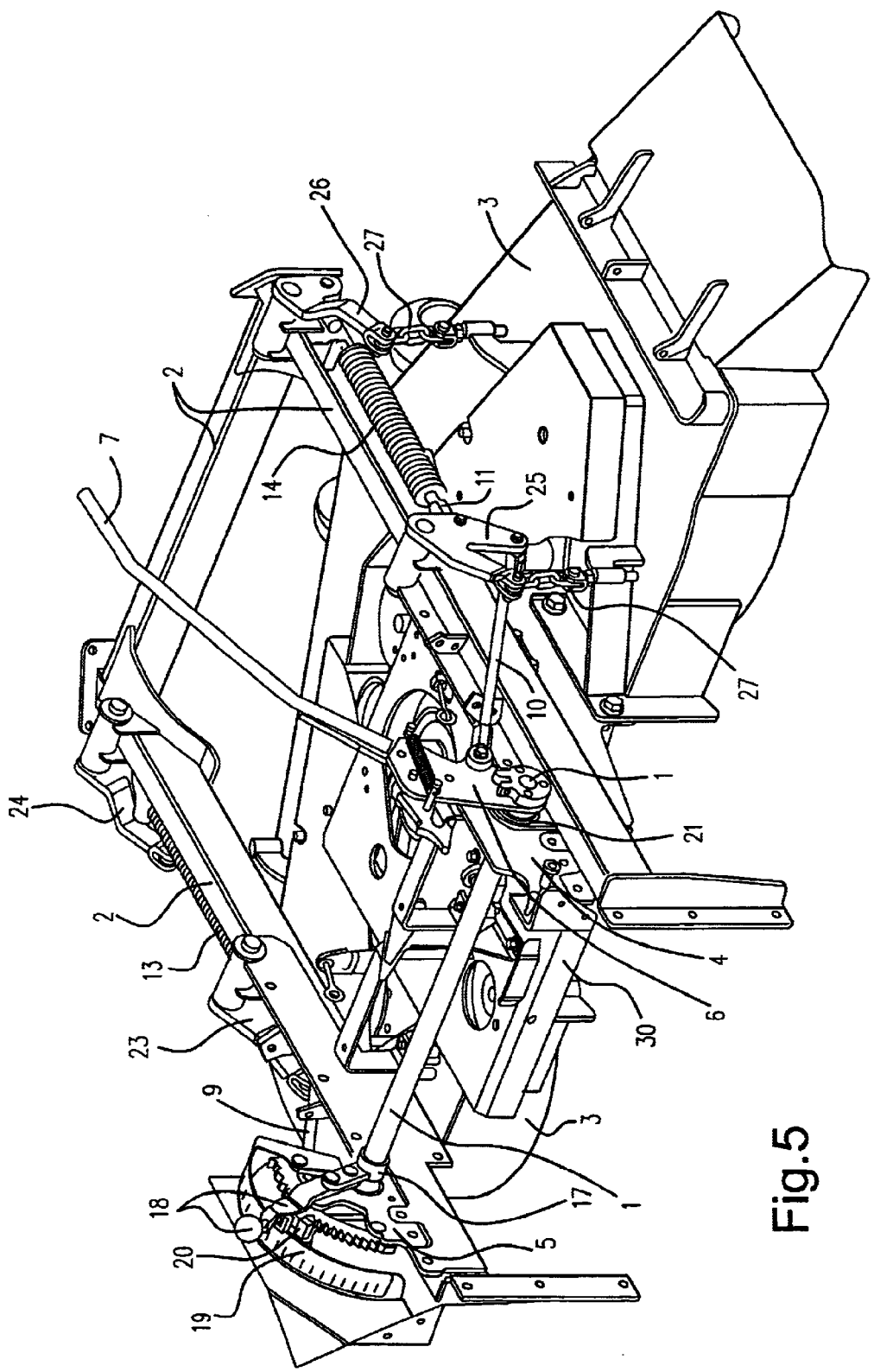
FIG. 5 is another perspective view of the deck lift system of the mower of FIGS. 1–4.
Figure 6:
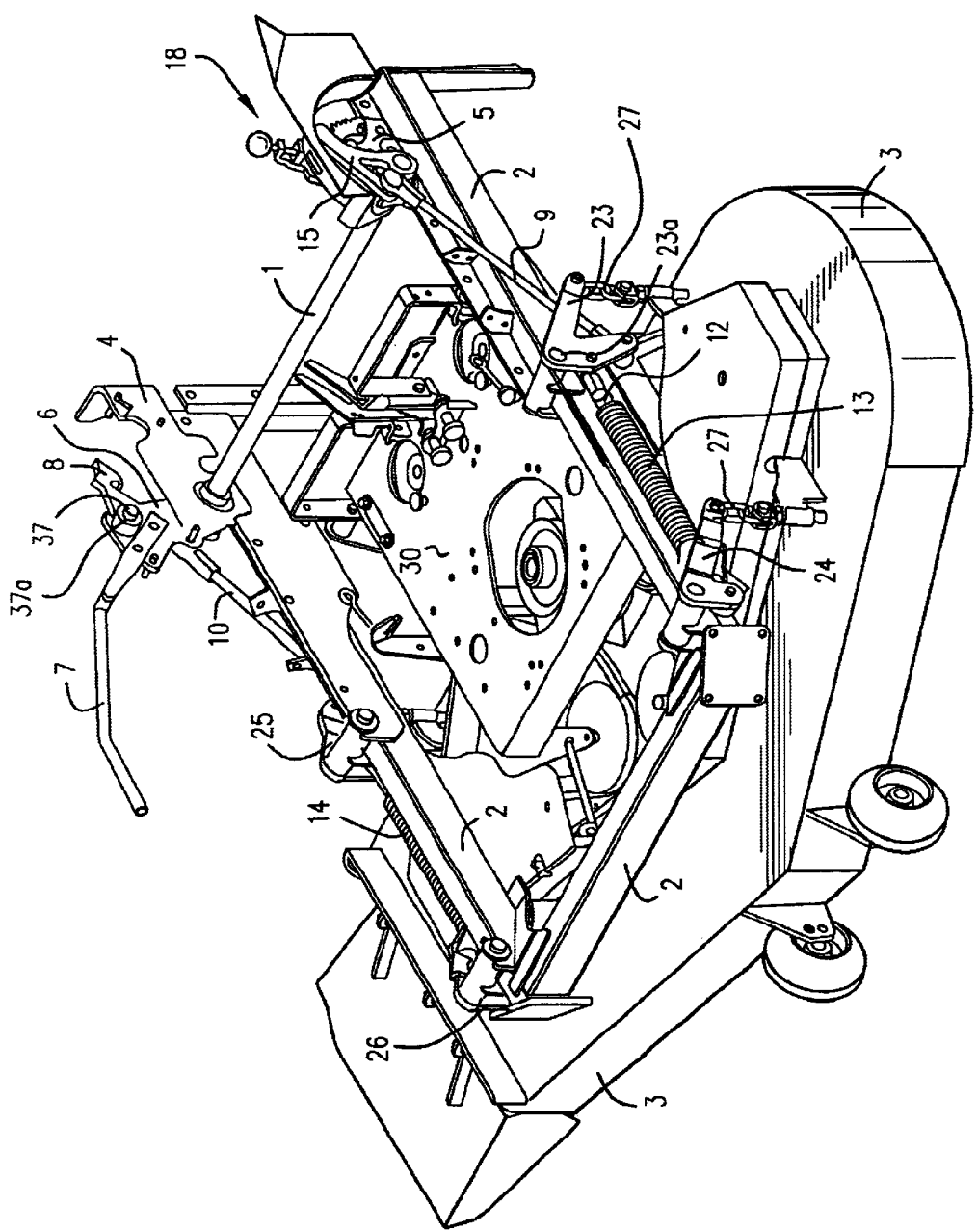
FIG. 6 is another perspective view of the deck lift system of the mower of FIGS. 1–5.
Figure 7:
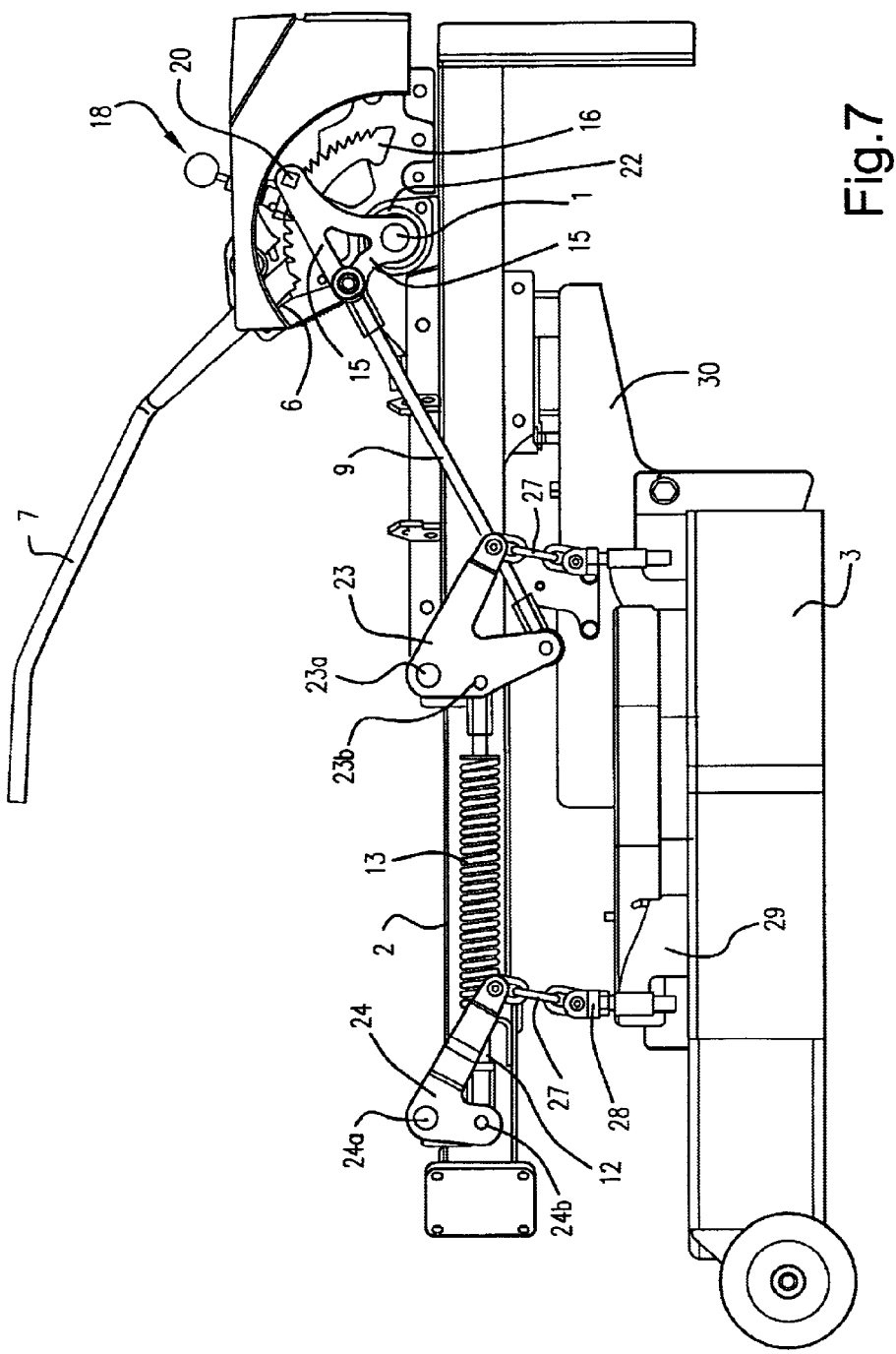
FIG. 7 is a side plan/elevational view of the deck lift system of the mower of FIGS. 1–6, taken from the side of the mower opposite FIG. 4.

FIGS. 1–2 illustrate a zero radius turning self-propelled power lawn mower according to an example embodiment of this invention. An operator of the mower may use the mower either when sitting down on the seat or alternatively when standing up on the foot platform. In alternative embodiments of this invention, the mower may be used primarily as a sit-down mower, or primarily as a stand-on mower.

Referring to FIGS. 1–2, the lawn mower includes: operator seat 101 for the operator to sit on during mower operation; spring(s) or shock absorber(s) 103 for dampening the front of the seat for operator comfort; pivot axis 106 for enabling the seat support to fold up and be selectively deployed along with the seat; upwardly extending spaced apart and parallel supports or frames 108 provided between the operator's legs for supporting the seat support and for housing a mower battery (not shown) or tools therebetween; stationary or pivotable foot platform 109 on which the operator may stand during mower operation; frame 2 for suspending or supporting cutter deck 3; engine deck 30 which includes a plane upon which the engine is mounted; a pair of laterally spaced side plates 114 extending upwardly from engine deck 30 or frame 2 in order to support (directly or indirectly) at least (1) normally stationary handlebar 132, (2) a pair of spaced apart pivotable front handle grips 133 (in FIGS. 1–2 one of the pair is in a forward position and the other in a rearward position), and (3) a pair of spaced apart rear handle grips 134 (see U.S. Pat. No. 5,809,755, incorporated herein by reference); a pair of front casters or wheels 137 supported by the frame and/or the cutter deck assembly; combustion engine 138 mounted on the plane of engine deck 30; an engine shaft (not shown) extending from the engine 138 downwardly through an aperture in the engine deck 30 for driving the cutter blades via belts and pulleys and pumps for the wheel drive system; an operator who may operate the mower either while sitting on seat 101 or when standing on platform 109; a pair of independently drivable rear drive wheels 143 which rotate about a common rear drive wheel axis and corresponding right and left hand hydrostatically controlled rear drive wheel motors whose wheel driving direction and speed are controlled by hydro pumps via pivoting handle controls 133 and/or 134 in a known manner as described in U.S. Pat. No. 5,809,755 which is incorporated herein by reference.

In certain embodiments of this invention, engine 138 is moved forward relative to certain conventional mowers so that the drive shaft thereof is located forward of the front edge of rear drive wheels 143. Moreover, in certain embodiments, the entire engine 138 is located forward of the front edge of rear drive wheels 143. This forward positioning of the engine permits additional weight to be provided closer to the front of the mower in order to offset weight distributed by the operator when on seat 101.

The location, function, and structure of platform 109, hydro pumps, and wheel motors may be as shown and/or described in any of U.S. Pat. No. 5,765,357 or 5,809,755, both of which are hereby incorporated herein by reference. In this regard, referring to FIGS. 1–2, the left rear drive wheel (one of 143) may be driven in a forward direction by one wheel motor while simultaneously the right rear drive wheel is driven in a rearward direction by the other wheel motor at approximately the same speed so that the mower conducts an approximate zero radius turn about a vertical zero radius turning axis 165 that is spaced equal distance between the rear wheels 143 and extends upwardly through the common rear wheel axis. In alternative non-zero radius turning embodiments, both rear drive wheels 143 may be mounted on a single supporting axle.

In zero radius turning embodiments herein, at least a portion of foot platform 109 may be positioned so that the operator when standing on the platform is substantially uneffected by centrifugal force during zero radius turns of the mower. In certain embodiments, platform 109 may be positioned so that it is intersected by the zero radius turning axis. In other embodiments, platform 109 is positioned relative to handle grips 132–134 so that the operator when standing on platform 109 and gripping a portion of the handle control assembly is substantially uneffected by centrifugal force created during approximate zero radius turns of the mower and at least a portion of his or her body may be on or near (e.g., within six inches of) the vertical turning axis 165. In certain embodiments, handle grips 132–134 are located forward of the vertical turning axis 165 and the platform on or rearward thereof so that the operator when standing on platform 109 is substantially uneffected by centrifugal force created during zero radius turns of the mower. In any of the above embodiments, at least a portion (or in some embodiments a substantial portion such as a thigh, head, torso, shoulder, chest, stomach, or the like) of the standing operator's body may be substantially at or near the vertical zero radius turning axis 165 during mower operations such as turning, going up hills, or during flat terrain operation.

The deck lift system is more clearly illustrated in FIGS. 3–10. The deck lift system enables the cutting deck 3 to be raised and lowered selectively by the operator in order to adjust the cutting height of the mower. In certain embodiments, such as those illustrated herein, the engine deck 30 is raised/lowered along with the cutting deck 3. Deck heights are easily set as will be explained in more detail below. For example, when deck lift lever 7 is pulled upwardly/rearwardly by the operator, the cutter deck assembly 3 together with the engine deck 30 is/are raised so as increase the height of the mower cut. Chain linkage 27 suspends the deck 3 from frame 2 at four different locations (two on each side of the mower) and enables the cutter deck 3 (and the engine deck on top of it) to be raised and lowered in accordance with the position of lever 7.

Referring to FIGS. 3–10, the deck lift system includes: deck lift lever 7, frame 2, cutter deck 3, rearwardly located cross interlink bar 1 that is connected to lever 7 so as to rotate therewith, right-side cross bar 1 support 4, left-side cross bar 1 support 5 which supports both bar 1 and arcuate height setting cog 16, latch support 6 (located only on the right side of the mower in certain embodiments) which is affixed to bar 1 and lever 7 for rotation therewith, latch (or hook) 8 for hooking onto bolt, pin or projection 35 in order to hold cutting deck 3 at a high elevation/position for transport (see FIG. 8(c)), where projection 35 is affixed to and projects from support 4 and latch or hook 8 is pivotally attached to support 6 via pivot axis (e.g., bolt) 37, left-rear deck lift pull rod 9, right-rear deck lift pull rod 10, right front deck lift pull rod 11, left-front deck lift pull rod 12, where rear deck lift pull rods 9–10 are operatively associated with pull lever 7 and bar 1 so that when lever is pulled back/rearward/up and bar rotates counterclockwise as viewed in FIG. 8 then rods 9–10 are pulled rearward in order to cause the deck 3 to lift (note: all of rods 9–12 are "pull" rods which pull during deck lifting in order to resist bending), left deck lift spring 13 which at least partially surrounds left-front pull rod 12, right deck lift spring, right deck lift spring 14 which at least partially surrounds right-front pull rod 11 (springs 13–14 are biased so as to make it easier for deck lifting, and a tube is between each spring 13, 14 and the interior rod in order to protect the rod and keep the spring straight), deck lift lever or stop bracket 15 which is welded to bar 1, toothed cog 16 which is arcuate in shape and includes teeth spaced at varying increments which correspond to different height settings for cutting deck 3, deck height selector pivot arm 17 which is pivotally attached to bar 1 and pivots with respect thereto, deck height selector 18 mounted on selector pivot arm 17, deck height selector label 19 which lists different deck heights associated with different teeth in cog 16, stop pin 20 welded to bracket 15 so that the position of pin 20 may be adjusted in order to adjust the height of deck 3 (stop pin 20 stops or comes to rest against selector 18 in order to set the cutting height of the mower and thus the height of deck 3), right side ball bearing 21 for rotationally supporting bar 1, left side ball bearing 22 for rotationally supporting bar 1, left-rear deck lift arm 23, left-front deck lift arm 24, right-rear deck lift arm 25, right-front deck lift arm 26, deck lift linkage or chain 27 (attached to each arm 23–26 for supporting deck 3 from the respective arm), deck adjustment bolt 28 (one provided per each linkage 27) used to adjust the height of deck 3 relative to the linkage 27 and corresponding arm 23–26, deck adjustment bolt 28 support bracket 29, clamp 31 for affixing latch support plate 6 to bar 1 and allowing bar 1 to be installed easily through bearings 21–22, key 32 provided for alignment purposes, clamp bolt 33, clamp nut 34, projection (e.g., step or shoulder bolt) 35 for catching hook or latch 8, hook reset projection (e.g., bolt) 36 whose position is adjustable in slot 36a defined in support 4, hook/latch 8 pivot (e.g., bolt) 37, spring support (e.g., bolt) 38 affixed to latch/hook 8 for supporting an end of spring 39 (bolt 38 is also used to stop latch 8 against latch support plate 6), spring support (e.g., bolt) 40 affixed to latch support plate 6, slot 41 provided in plate 6 for enabling positional adjustment of bolt 40, ramp surface 42 of latch/hook 8 which enables the latch 8 to slide along and against projection 35 so that it can eventually catch on projection 35 via hook area 8a, abutment surface 43 of latch 8 which abuts and slides on projection 35 during the unlatching of latch 8 from projection 35, and arc-shaped ramp surface 44 on the back-side of latch 8 which abuts and slides on bolt 36 during the process of resetting latch 8 (e.g., see FIG. 8(e)).

It is noted that latch/hook 8 actually pivots on roller bearing(s) pressed into a tube 37a that is welded to the latch and is held by bolt 37. This is perhaps best shown in FIG. 6. These bearings are provided so as to enable the latch 8 to pivot smoothly so as to reduce the likelihood of it getting stuck directly on the center point over the axis of bolt 37.

Referring in particular to FIGS. 9(a)–(b), the height setting mechanism of the deck lift system further includes sleeve bearing 47 installed in the portion of pivot arm 17 that is attached to bar 1, deck height selector bracket 48 including surface 53 that an end of spring 50 rests against, deck selector plunger 49 which engages teeth in cog 16 in order to set the height of the cutter deck 3, the plunger 49 including head 49a for cog teeth engagement, shaft 49b and surface 54 which the other end of spring 50 rests against, spring 50 provided over the neck or shaft of plunger 49 in order to bias the plunger head 49a downward so as to efficiently engage the cog teeth, pull knob 51 which the operator can pull upwardly in order to disengage plunger head 49a from the cog 16 teeth in order to adjust the height setting of the deck 3, nut 52 attached to the top portion of the threaded shaft of plunger 49 and provided to help secure knob 51 in place, bolts 55 and nuts 56 for securing deck height selector pivot arm 17 to bracket 48.

Referring in particular to FIG. 10, the deck supporting structure of the deck lift system further includes (at each of the four locations of deck lift arms 23–26) tube 57 welded to deck adjustment bolt support bracket 29 so as to enable deck adjustment bolt 28 to pass through and support deck through the help of metal washers 58, 60 and rubber washer 59 that is provided to dampen vibration between the deck assembly and the mower frame, and adjustment nut(s) 61 provided on the end of bolt 28 so as to enable the deck 3 height to be fine tuned at four different locations.

An example operation of the deck lift system of FIGS. 1–10 will now be described, with particular reference to FIGS. 4–9.

The cutter deck 3 begins, in this example, at a particular cutting height (e.g., 2.5 inch blade cutting height) in Stage 1 (see FIG. 8(a)). This particular cutting height is set by cutting height selector 18, as a function of which teeth in cog 16 the plunger head 49a of deck height selector 18 is located between. In order to adjust the location of selector 18, knob 51 is pulled upward against the bias of spring 50 and the selector is moved along the cog 16 teeth until plunger head 49a is over the desired cog tooth/teeth location (the cutting height label 19 adjacent the cog 16 teeth indicates cutting height associated with different cog teeth). Once the plunger head 49a of the selector 18 is over the desired area of cog 16, the knob 51 is allowed to be biased back downward by spring 50 so that the plunger head 49a of the selector is biased into (i.e., locked into) place between the desired cog teeth. In Stage 1, at this particular cutting height, stop 20 (which moves along with bar 1 and lever 7) is biased by the weight of the deck(s) 3, 30 up against selector 18. Because selector 18 prevents stop 20 from moving any further to a lower cutting height and the weight of the deck(s) prevent stop 20 from moving in the other direction (i.e., in FIG. 7 selector 18 prevents stop 20 from moving any further counterclockwise, and the deck(s) weight prevents the stop 20 from moving clockwise), the cutting height is set by the position of stop 20 in Stage 1.

When it is desired to adjust the height of cutting deck 3, the operator pulls lever 7 up/back which causes latch support plate 6, lever 7 and bar 1 to all simultaneously rotate in direction D as shown in FIG. 8(b) (Stage 2). When lever 7 moves in direction D, this causes bar 1 to also rotate in direction D along with lever 7 which in turn causes bracket 15 to rotate in the same direction. This rotation of bracket 15 (i.e., in the clockwise direction as viewed in FIGS. 6–7) causes left rear pull arm 9 to be pulled by bracket toward the rear of the mower, which in turn causes left rear deck lift arm 23 to rotate counterclockwise about axis 23a as viewed in FIGS. 6–7. This rotation of rear deck lift arm 23 causes linkage 27 associated with arm 23 to lift cutter deck 3 upward. Likewise, this rotation of arm 23 causes left-front deck lift pull rod 12 (which is connected to arm 23 at 23b) to be pulled toward the rear of the mower which of course causes left-front deck lift arm 24 to rotate counterclockwise about axis 24a as viewed in FIGS. 6–7. It is noted that rod 12 is pivotally connected to arm 24 at 24b (see FIG. 7). When arm 24 rotates in such a manner, this causes linkage 27 associated therewith to lift up deck 3. The deck lift arms 25–26 on the right hand side of the mower function in a similar manner, so that pulling of lever 7 causes plate 6 to rotate which in turn causes 10 and 11 to be pulled toward the rear of the mower so that the linkage associated with arms 25–26 lifts up deck 3 from the right side as well. Accordingly, it can be seen that when lever 7 is pulled upward/rearward by the operator, this causes the cutter deck 3 to be lifted upward (i.e., raised) via each of the deck lift arms 23–26 via their corresponding linkage 27 (i.e., deck 3 is lifted/raised by linkage 27 at four different lifting locations).

Turning back to FIG. 8(b), the pivot axis of support plate 6, lever 7 and bar 1 is 20 defined by the elongated axis of bar 1. Each of plate 6, lever 7 and bar 1 rotate in direction D about this axis of bar 1 when lever 7 is pulled back/up in direction D by the operator. It is noted that, as in FIG. 8(b), when spring 39 has its longitudinal axis on the lower side of the axis of bolt 37, then spring 39 is biasing latch 8 in direction D1 (latch 8 pivots about the axis defined by bolt 37) so that surface 42 of the latch 8 contacts/abuts and slides along projection 35. As the operator continues to pull lever 7 back in direction D, surface 42 of latch 8 slides along projection until finally hook area 8a of latch 8 slips over projection as shown in FIG. 8(c) (Stage 3). In FIG. 8(c), latch 8 is locked onto projection 35 due to the biasing force of spring 39 which biases latch in direction D1. Because latch 8 is locked onto projection 35, lever 7 cannot move in the direction opposite direction D and therefore the deck 3 is prevented from being lowered. Thus, in the FIG. 8(c) position (Stage 3), the deck 3 is at a height significantly greater than the deck 3 height in FIG. 8(a). This greater elevation of deck 3 in FIG. 8(c) (Stage 3) is useful for mower transport and/or operation in high cutting environments.

Moreover, in FIG. 8(c) projection 35 is preventing lever 7 from moving back forward so that the deck 3 is also prevented from being lowered. Because projection 35 is performing this stopping function in FIG. 8(c), stop 20 is not in contact with selector 18 which means that the selector 18 can be easily adjust/moved in any direction along cog 16 to re-set cutting height. Those skilled in the art will realized that it is preferably that selector 18 only be moved when stop 20 is not resting against it. Accordingly, the FIG. 8(c) position is ideal for adjusting the position of height setting selector 18.

Assuming that the selector 18 has been adjusted to set a new cutting height (e.g., a new cutting height of 2 inches that is lower than the previous height of FIG. 8(a)), to cut grass at that height it is necessary to move the deck from the FIG. 8(c) position (i.e., upper resting/transport position) down to the new cutting height position. To do this from the FIG. 8(c) position, lever 7 is first pulled back by the operator in direction D as shown in FIG. 8(d) (Stage 4). This causes hook area 8a of the latch 8 to move away from projection 35. Moreover, because angled/ramped surface 43 of latch 8 is sliding along projection 35 during this time, the pulling back of lever 7 in direction D as shown in FIG. 8(d) ultimately causes the longitudinal axis of spring 39 to move to the upper or other side of the axis of latch mounting bolt 37.

Referring to FIG. 8(e), once the longitudinal axis of spring 39 has moved to the upper side of the axis of latch mounting bolt 37, then spring 39 begins to bias the latch 8 in a new direction (i.e., in new direction D2 about bolt axis 37). Thus, once the spring 39 axis moves to the other side of bolt 37 axis, the spring begins biasing latch 8 in direction D2 away from projection 35 and into hook reset bolt or projection 36 as shown in FIG. 8(e) (Stage 5). Then, once latch 8 is resting against reset projection 36, the operator reduces the pressure applied to lever 7 and allows the lever to begin slipping back in direction D3 (the weight of the decks 3, 30 help bias lever 7 in direction D3). As lever moves in direction D3, ramp or arcuate surface 44 of latch 8 slides against reset projection 36 as shown in FIG. 8(e) while spring 39 is still biasing latch 8 away form projection 35 and against reset projection 36.

Referring to FIG. 8(f), as lever 7 continues to move in direction D3 to lower decks 3, 30, latch projection or protrusion 8b on the back side of latch 8 ultimately reaches reset projection 36 (Stage 6) and at about this time the latch shape has caused the longitudinal axis of spring 39 to have moved back on the other (i.e., lower) side of the axis of bolt 37 thereby causing the biasing direction of spring 39 to again change from direction D2 to direction D1 as shown in FIG. 8(f). However, this biasing direction of spring 39 does not switch back in this regard until after hook area 8a of latch 8 has moved past projection 35 and cannot latch onto the projection (see FIG. 8(f)). This change of biasing direction of spring 39 causes the spring 39 to move latch 8 from a position where it is abutting reset projection 36 (FIG. 8(f)) to a position where it is again abutting projection 35 (FIG. 8(g)) (i.e., to move from Stage 6 to Stage 7). Once latch 8 is in the position illustrated in FIG. 8(g), as lever 7 and plate 6 (and thus bar 1) continues to move/pivot in direction D3 and lower the decks 3, 30, surface 42 of latch 8 slides along projection 35 as the decks 3 and 30 are lowered. Lever 7, plate 6 and bar 1 continue to move/pivot in direction D3 thereby lowering the decks 3, 30 stop 20 comes into contact with set/locked selector 18 at the desired cutting height (this may be a position similar to that of FIG. 8(a) where spring 39 is biasing latch 8 in a direction away from bolt 36).

In view of the above, it can be seen how deck(s) 3 and/or 30 can be efficiently and easily raised/lowered in different embodiments of this invention. The structure illustrated in the drawings herein is provided for purposes of example only, and is not limiting unless specifically recited in the attached claims.

Once give the above disclosure, many other features, modifications, and improvements will become apparent to the skilled artisan. Such other features, modifications, and improvements are therefore considered to be a part of this invention, the scope of which is to be determined by the following claims.

What is claimed is:

1. A power mower comprising:
   a cutting deck;
   at least one drive wheel;
   an engine for driving at least one cutting blade;
   a deck lift system for selectively raising and lowering the cutting deck, said deck lift system including:
      a deck lift lever which when pulled causes a laterally oriented bar and a support to rotate about a common axis defined by an axis of said bar in order to lift said cutting deck;
      a pivotal latch pivotally coupled to said support at a latch pivot axis;
      a spring for biasing said pivotal latch relative to said support;
      wherein said spring biases said pivotal latch in a first direction when a longitudinal axis of said spring is on a first side of said latch pivot axis, and said spring biases said pivotal latch in a second direction when the longitudinal axis of said spring is on a second different side of said latch pivot axis; and
      wherein said longitudinal axis of said spring is switched from the first side of said latch pivot axis to the second different side of said latch pivot axis during raising of said cutting deck as said deck lift lever is pulled.

2. The power mower of claim 1, wherein said deck lift system further includes a first projection and a second projection protruding from a surface of said support, and wherein when said spring is on the first side of said latch pivot axis said spring biases said pivotal latch in the first direction toward the first projection, and when said spring is on the second different side of said latch pivot axis said spring biases said pivotal latch in the second direction away from the first projection and toward the second projection.

3. The power mower of claim 2, wherein pulling of the lever causes first, second, third, and fourth deck lift pull rods to moves toward a rear of the mower which in turn causes respective first, second, third and fourth deck lift arms to rotate and cause said cutting deck to be raised at four different locations.

4. The power mower of claim 1, further comprising a foot platform that is at least partially located between said one drive wheel and another drive wheel, these drive wheels being first and second rear drive wheels, respectively.

5. The power mower of claim 4, wherein the mower is a zero radius turning mower wherein the first and second drive wheels are each independently driveable in forward and reverse directions so as to enable the mower to make zero radius turns about a vertical turning axis.

6. The power mower of claim 5, wherein said vertical turning axis intersects said foot platform.

7. The power mower of claim 5, further comprising a seat that is selectively deployable, so that an operator may operate the mower either when standing on the foot platform or while sitting on the seat.

8. The power mower of claim 1, wherein said longitudinal axis of said spring: (a) is switched from the first side of said latch pivot axis to the second different side of said latch pivot axis during raising of said cutting deck as said deck lift lever is pulled, and (b) is switched back from the second side of said latch pivot axis to the first side of the latch pivot axis during lowering of said cutting deck as said deck lift lever moves in a downward and/or forward direction in which the lever is biased by at least weight of said cutting deck.

* * * * *